(12) United States Patent
Kemp, III

(10) Patent No.: US 6,568,516 B2
(45) Date of Patent: May 27, 2003

(54) SWITCHABLE CLUTCH

(75) Inventor: Fred M. Kemp, III, Rock Hill, MO (US)

(73) Assignee: U.S. Reel - Missouri, L.L.C., St. Louis, MO (US)

( * ) Notice: Subject to any disclaimer, the term of this patent is extended or adjusted under 35 U.S.C. 154(b) by 11 days.

(21) Appl. No.: 09/812,609

(22) Filed: Mar. 20, 2001

(65) Prior Publication Data

US 2002/0017441 A1 Feb. 14, 2002

Related U.S. Application Data

(60) Provisional application No. 60/222,562, filed on Aug. 3, 2000.

(51) Int. Cl.[7] ............................................... F16D 3/34
(52) U.S. Cl. ............................................ 192/45; 192/47
(58) Field of Search .................. 192/45, 47; 188/82.84

(56) References Cited

U.S. PATENT DOCUMENTS

| | | | | |
|---|---|---|---|---|
| 4,392,840 A | * | 7/1983 | Radocaj ........................ 474/117 |
| 4,770,279 A | * | 9/1988 | Shiozaki et al. ................ 192/45 |
| 4,949,824 A | * | 8/1990 | Buckley et al. ................ 192/45 |
| 5,152,726 A | * | 10/1992 | Lederman .................... 192/45 |
| 5,265,706 A | * | 11/1993 | Iga .............................. 192/45 |
| 5,370,330 A | * | 12/1994 | Uehara et al. ................ 242/247 |
| 5,570,851 A | | 11/1996 | Yamaguchi et al. ......... 242/247 |
| 5,695,031 A | * | 12/1997 | Kurita et al. ................. 192/45 |
| 5,927,630 A | | 7/1999 | Katayama .................... 242/248 |
| 6,044,945 A | * | 4/2000 | Muramatsu ................... 192/45 |
| 6,338,402 B1 | * | 1/2002 | Muramatsu et al. .......... 192/45 |

* cited by examiner

Primary Examiner—Jack Lavinder
Assistant Examiner—Marlino Sy
(74) Attorney, Agent, or Firm—Polster, Lieder, Woodruff & Lucchesi, L.C.

(57) ABSTRACT

A clutch for use in an open faced fishing reel that when engaged operates as a conventional one-way clutch, with the pins or needles rolling with the shaft and allowing for movement in one direction but binding the shaft to an outer fixed surface, prohibiting rotation, when the shaft is urged in the opposite direction, but when is disengaged, is switchable from one-way action to freewheel action i.e. shaft motion allowed in both directions by separating the outer binding surface from the main housing of the clutch, allowing it to move radially and allow the surface required to bind the shaft to move away from contact with the pins and shaft, thereby allowing the shaft to freewheel. The clutch is particularly well suited for use in a fishing reel.

10 Claims, 6 Drawing Sheets

SWITCHABLE CLUTCH

CROSS-REFERENCE TO RELATED APPLICATIONS

This application claims the benefit of U.S. Provisional Ser. No. 60/222,562 filed Aug. 3, 2000.

STATEMENT REGARDING FEDERALLY SPONSORED RESEARCH OR DEVELOPMENT

Not Applicable.

BACKGROUND OF THE INVENTION

Currently, there are several versions of clutches in fishing reels. Some of these are made "switchable" externally by alternately holding the outer ring of a one-way clutch or letting it freewheel. An exemplary apparatus is disclosed in U.S. Pat. No. 5,570,851, Yamaguchi, et al., assigned to Daiwa Seiko, Inc. ("Yamaguchi '851"). In Yamaguchi '851, a roller-type clutch is provided between the rotor and the reverse rotation prevention member so as to kinematically connect the rotor and the member to each other when the rotor is reversely rotated in such a direction as to unwind a fishing line.

Other clutches perform a disengagable one-way clutch action internally, that is, urging pins out of contact with the shaft, effectively disabling the one-way action. An example of this mechanism is disclosed in U.S. Pat. No. 5,927,630, Katayama, assigned to Daiwa Seiko, Inc. ("Katayama '630").

Both of these methods require manufacture of surfaces hard enough to be able to withstand rolling loads and other forces without degrading those surfaces, for example by gouging or pitting, so that materials such as hardened steel or high performance metal alloy similar to those typically used in the manufacture of ball bearings must be used. The use of these relatively expensive materials leads to greater expense in manufacture. Furthermore, those materials are frequently heavy, increasing the overall weight of the fishing reel, which is an undesirable characteristic. Additionally, the prior art clutches require adding more parts or complex parts to the fishing reel, increasing the overall complexity and manufacturing expense.

BRIEF SUMMARY OF THE INVENTION

The present invention divides the traditional clutch case into two parts, and involves urging the outer ring contact surfaces away radially from a binding position with rolling members or pins and a shaft, thereby rendering the one-way action of the clutch disabled. This solution has several benefits over existing clutches, either externally or internally controlled. The first benefit is that the switchable clutch of the present invention has only one more part than a conventional one-way clutch. The second benefit is that only one relatively simple part needs to move, so multiple parts or a complex single part is not required to change the action. A third benefit is that since the housing half of the case primarily places rolling members in position and does not take significant loads, the housing half can be made out of plastic, carbon fiber, or other non-metal material. This makes for a strong, yet extremely lightweight switchable clutch at a lower cost. Other and further advantages will become apparent to those skilled in the art in light of the following disclosure.

More specifically, the clutch of the present invention, when engaged, operates like any other one-way clutch. The pins or rolling members roll with the shaft and allow for movement in one direction, but bind the shaft to an outer fixed surface, prohibiting rotation when the shaft is urged in the opposite direction. However, the present invention is made switchable from one-way action to free-wheel action, that is, shaft motion is allowed in both directions by separating the outer binding surface from the main housing of the clutch, allowing it to move radially and allow the surface required to bind the shaft to move away from contact with the rolling members and shaft, thereby allowing the shaft to freewheel. Optionally, stops limit rotation beyond the off position and place the actuator in an optimal "on" position.

BRIEF DESCRIPTION OF THE SEVERAL VIEWS OF THE DRAWINGS

In the drawings.

Corresponding reference characters indicate corresponding parts throughout the several views of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what is presently believed to be the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
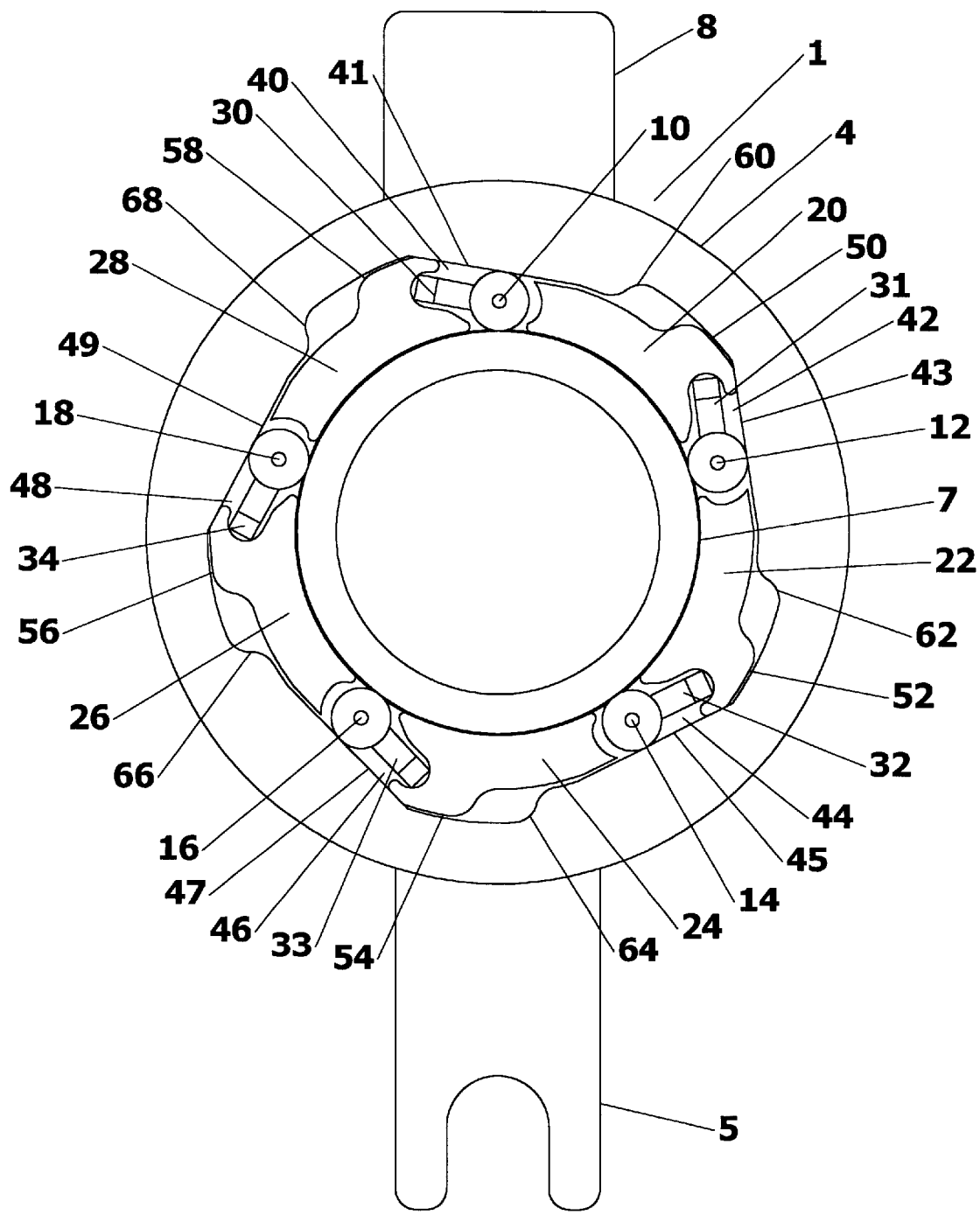
FIG. 1 is a front elevational view of a switchable clutch assembly of the present invention with the pin cover off.
Figure 2:
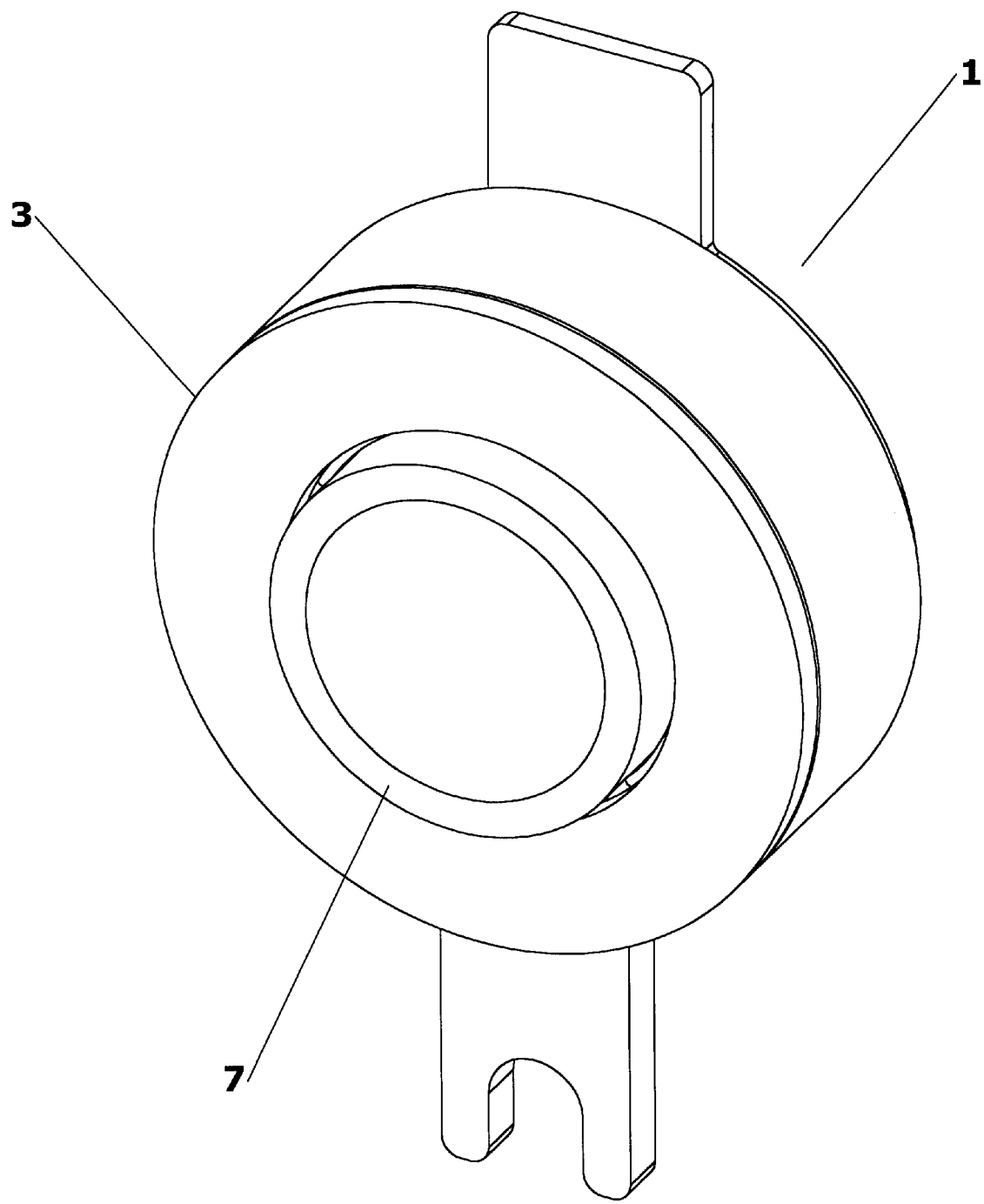
FIG. 2 is a perspective view of a switchable clutch assembly of the present invention around a shaft with the pin cover attached.
Figure 3:
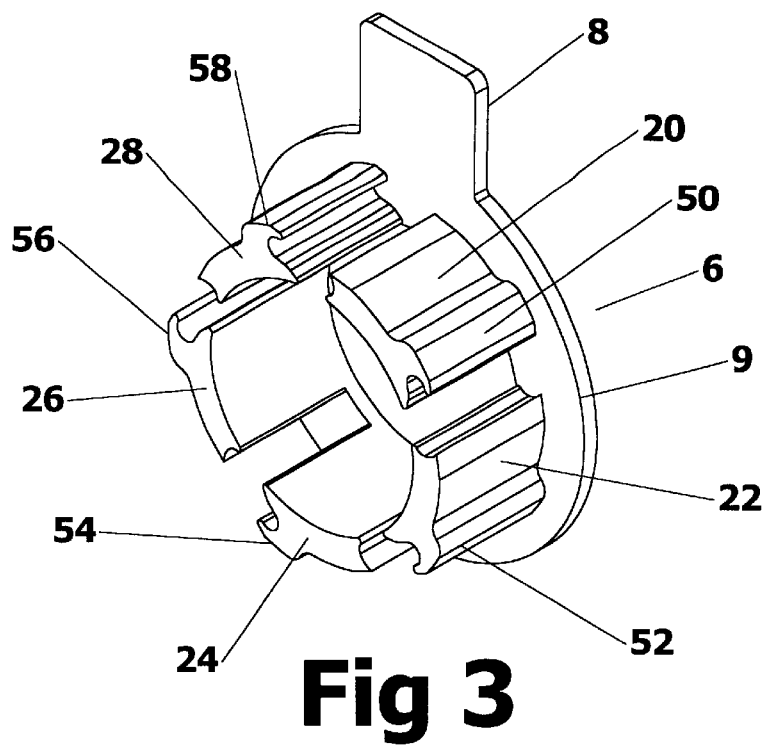
FIG. 3 is a perspective view of a housing member of a switchable clutch of the present invention.

Referring to FIGS. 1, 2 and 3, a clutch assembly of the present invention is shown generally at reference numeral 1. Clutch assembly 1 is preferably made of a combination of metal and a lighter weight material such as plastic, although any other suitable materials could be used. Clutch assembly 1 comprises an actuator member 4 and a housing member 6. Both actuator 4 and housing 6 are adapted to fit around a rotatable shaft 7. In the preferred embodiment of the present invention, the rotatable shaft 7 is about ten millimeters (about 0.393 inches) in outside diameter, which corresponds in size to a common conventional fishing reel shaft, although other sizes and uses may be possible with this invention. It should be understood that shaft 7, while shown as a hollow cylinder, may be solid as well. Shaft 7 is free to rotate in either a clockwise or a counterclockwise direction when the clutch is in an "off" or free-wheeling position, as will be described. Referring to FIG. 2, when fully assembled, the internal parts of the clutch are enclosed by a pin cover 3.

Cylindrical pins or rolling members, 10, 12, 14, 16, and 18, are captured between actuator 4 and housing 6 and held about shaft 7, as will be more thoroughly described below. Briefly, the pins or rolling members 10, 12, 14, 16 and 18 are held in operative engagement with shaft 7 by resilient or biasing members 30–34, while being free to rotate about their own axes. In the preferred embodiment of the present invention, biasing members 30–34 are metal leaf springs, although any number of springs, resilient materials or other biasing members could be utilized. Biasing members are preferably attached to clutch housing 6, as will be described.

Referring now to FIG. 3, the housing 6 has a housing fixing member 8 for attachment to a surface. In the preferred embodiment of the present invention, the surface would be an interior face of a fishing reel, through which a rotatable shaft is disposed, although other uses of this invention might involve other methods of fixing the housing including multiple contact points such as may exist with teeth or gears.

Housing 6 has a back plate 9, which preferably defines a flat planar surface for abutment with an interior face of a fishing reel. In the preferred embodiment, fixing member 8 is coextensive with back plate 9. A plurality of housing projections 20, 22, 24 26 and 28 extend a predetermined distance that is generally normal to the plane defined by back plate 9. The predetermined distance that each of projections 20, 22, 24, 26 and 28 extend from back plate 9 is preferably approximately equal, such that an imaginary plane defining the top surfaces of projections 20, 22, 24, 26 and 28 would be generally parallel to the plane defined by back plate 9.

Each projection 20, 22, 24, 26 and 28 has a generally arcuate outer surface of predetermined angle, and a generally arcuate inner surface of a predetermined angle. Raised portions 50, 52, 54, 56 and 58 may be formed at an end of the generally arcuate surfaces of projections 20, 22, 24 26 and 28, respectively.

Figure 4:
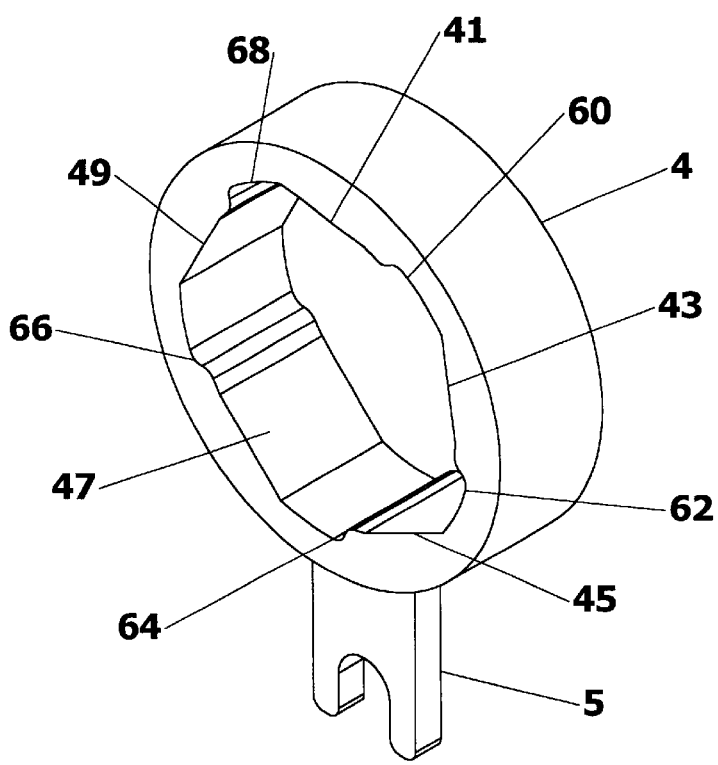
FIG. 4 is a perspective view of an actuating member of a switchable clutch of the present invention.

Referring now to FIG. 4, actuator 4 has an actuating arm 5 adapted to be movable from a first, "on" or fixed position to a second, "off" or free-wheeling position when associated with the housing 6. Although the preferred embodiment utilizes an actuating arm 5, those skilled in the art will appreciate that the actuator could be any other shape, or formed in other conventional ways. The actuator 4 could be a drawn cup, for example.

Actuator 4 preferably has a generally cylindrical outer surface, although any number of outer surface shapes could be employed. Although generally round, the interior surface of actuator 4 comprises flat inner surfaces or cam ramps 41, 43, 45, 47 and 49, and indented surfaces 60, 62, 64, 66 and 68. The flat inner surfaces form an oblique angle with respect to an imaginary line through the flat surface and perpendicular to a radial line through the center of the actuator, although the particular angle of the flat portion is not critical to the functioning of the clutch. In the preferred embodiment, the angle is between about eight and twenty degrees. The indented surfaces 60, 62, 64, 66 and 68 allow movement of the actuator within the housing.

Figure 5:
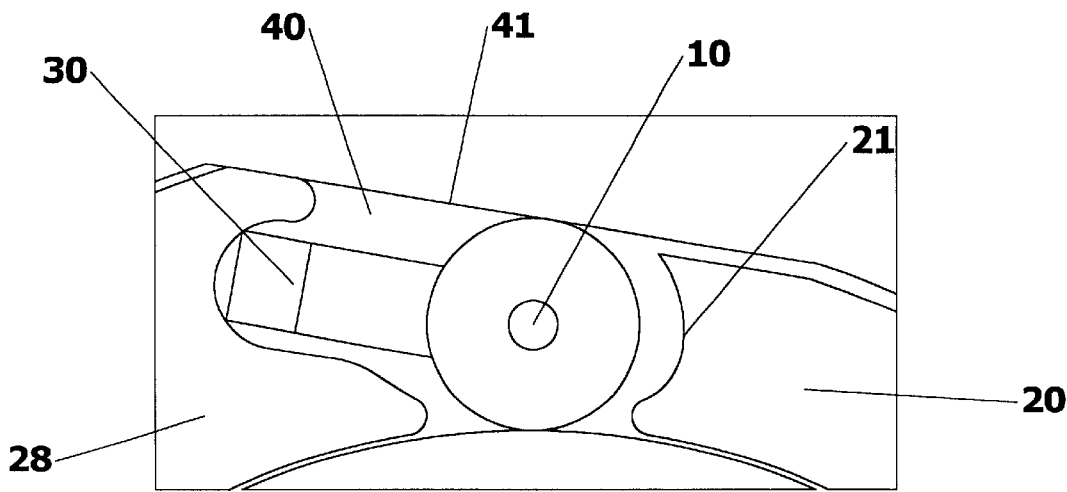
FIG. 5 is a detail view of a pin in the on or locked position.
Figure 6:
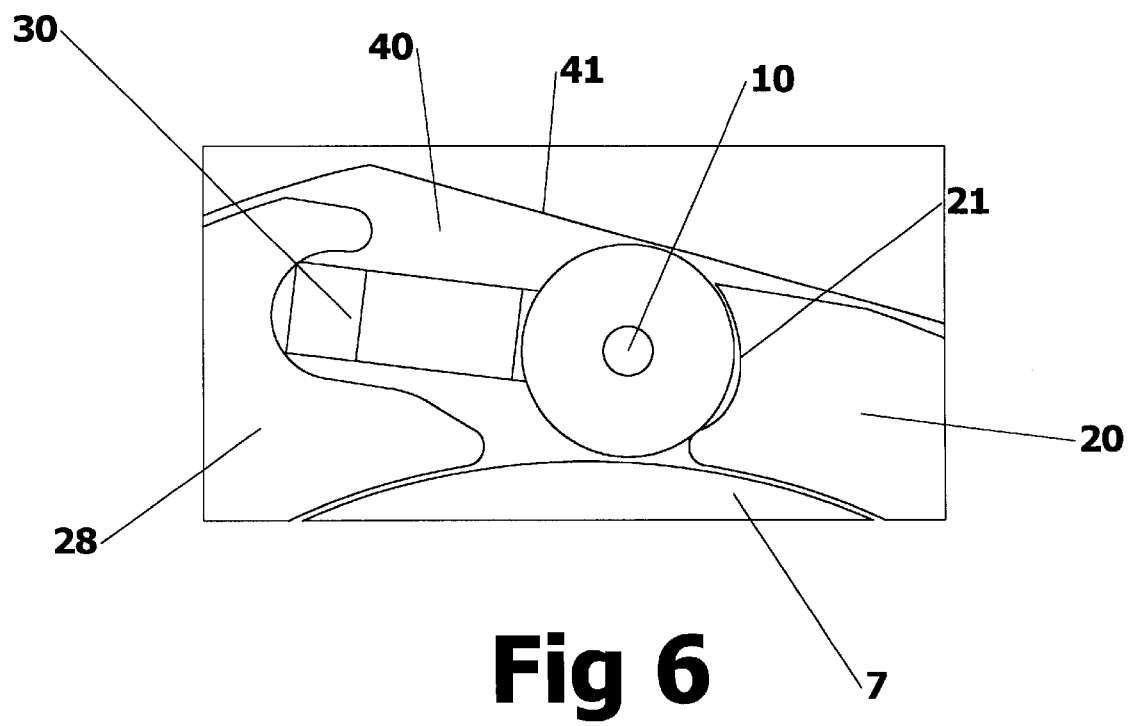
FIG. 6 is a detail view of a pin in the off or free-wheeling position.

As can best be seen in FIGS. 1, 5 and 6, when housing 6 is brought into operable communication with actuator 4, rolling members 10, 12, 14, 16 and 18 reside in spaces or pockets 40, 42, 44, 46 and 48 defined laterally by the spaces formed between projections 20, 22, 24, 26 and 28, and defined at their outermost boundary by inner surfaces 41, 43, 45, 47 and 49, of actuator 4 respectively, and by the external surface of the shaft 7 at their innermost boundary. The interaction between the housing and actuator could, of course, result in various shaped pockets other than the illustrative embodiment.

In FIGS. 1, 2 and 5, the clutch is shown in its first, "on" or locked position. In this position, rolling members 10, 12, 14, 16 and 18 are urged via biasing members 30–34 against inner surfaces 41, 43, 45, 47 and 49, and rotatable shaft 7 so as to prevent rotation in one direction. As the actuator 4 is rotated via actuator arm 5 in a clockwise direction as viewed in FIG. 1, for example, the inner surfaces 41, 43, 45, 47 and 49 move and break the previous contact positions with both the roiling members 10, 12, 14, 16 and 18 and rotatable shaft 7 thereby allowing the shaft to freewheel. In a preferred embodiment, further rotation of the actuator 4 is limited within the clutch by the interaction of surfaces such as the raised portions 50, 52, 54, 56 and 58 of housing 6 and the indented surfaces 60, 62, 64, 66 and 68 of the actuator 4. Rotation of the actuator may, alternately, be limited externally such as may be designed in an urging member that moves actuating arm 5. A detail of the "on" or locked position can be seen in FIG. 5. Rolling member 10 is held by biasing member 30 in pocket 40, against inner surface 41 of actuator 4 and shaft 7 and away from arcuate concave portion 21 of housing 6.

As can best be seen in FIGS. 1 and 6, when the actuator 4 is rotated clockwise, for example, and the inner surfaces 41, 43, 45, 47 and 49 of the actuator move away from a binding position, rolling member 10 is urged by the biasing member 30 toward and into concave portion 21 of housing 6, lifting rolling member 10 out of engagement with both rotatable shaft 7 and inner surface 41 thus allowing rotatable shaft 7 to turn in either direction, or "free-wheel" in the second, "off" position of the clutch.

Figure 7:
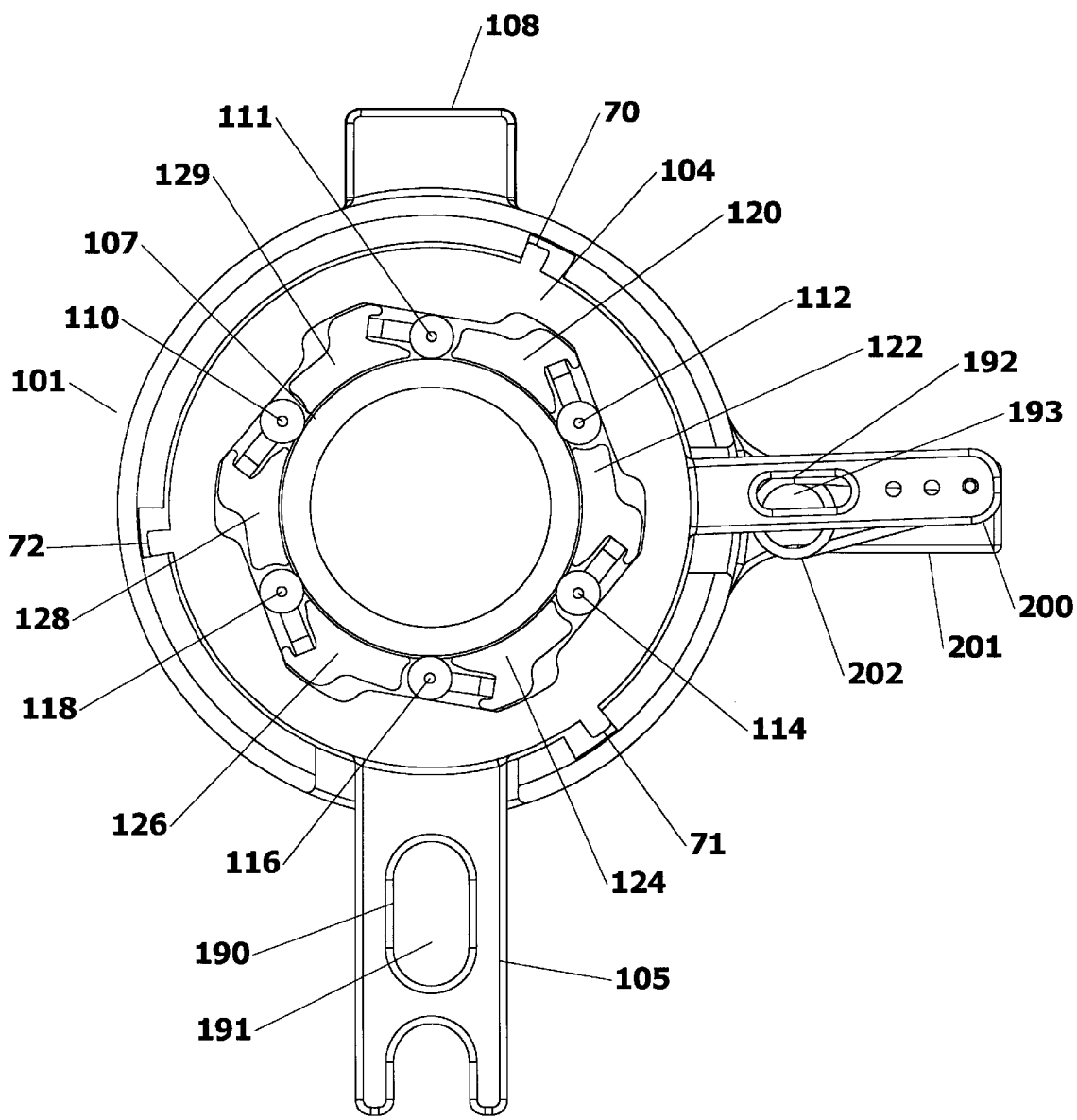
FIG. 7 is a front elevation view of an alternative embodiment of the switchable clutch assembly with the pin cover off.
Figure 8:
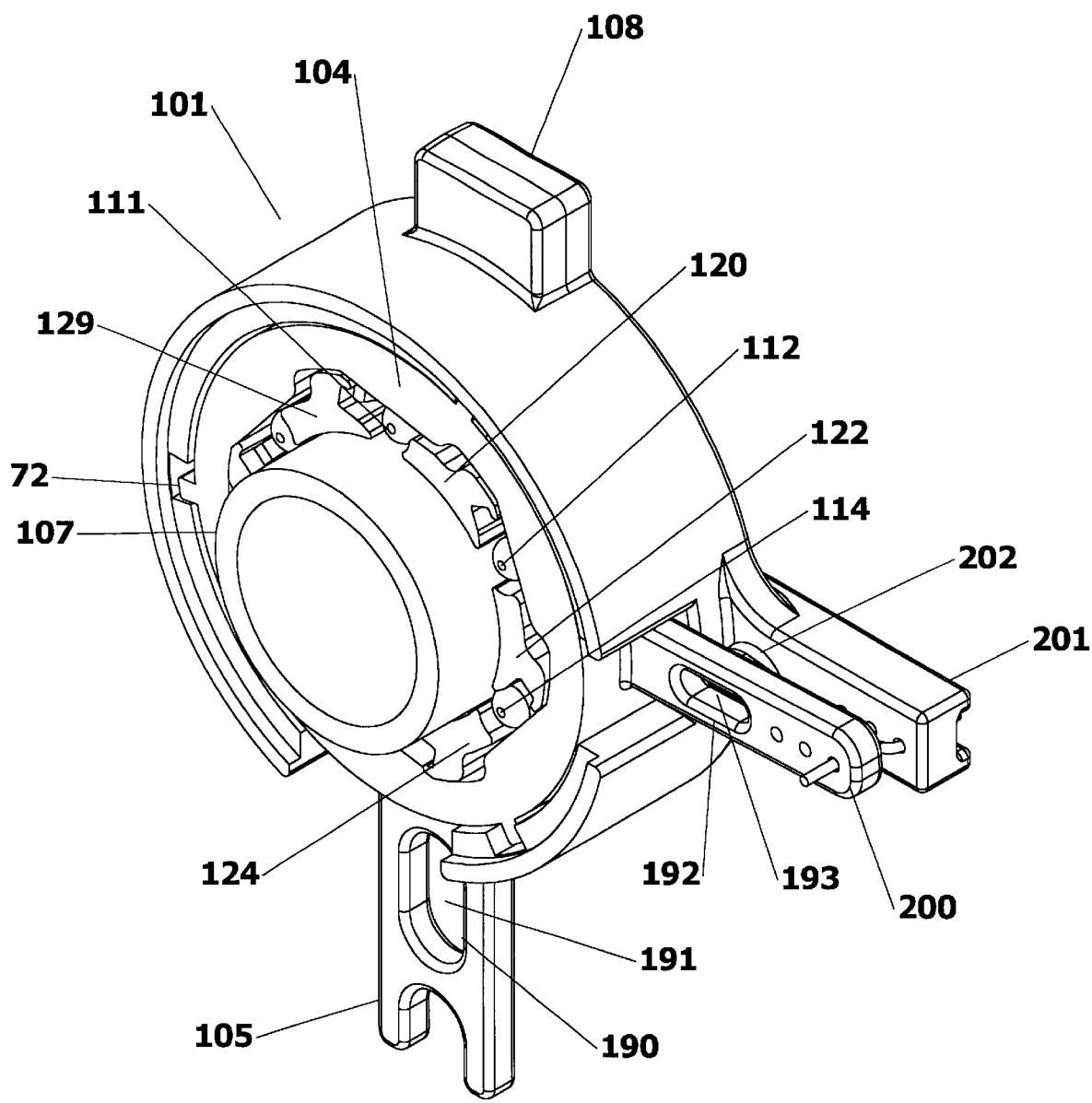
FIG. 8 is a perspective view of the alternative embodiment of the switchable clutch assembly of FIG. 7 with the pin cover off.

Referring now to FIG. 7 an alternative embodiment of the present clutch 101 has stops 70, 71, and 72. Stops 70, 71 and 72 act to limit further rotation of the actuator. There is a limit to the amount of movement that the actuator can travel beyond its "on" and "off" positions. As a result, the addition of stops either internal to the clutch or externally may assist in accurately placing the actuator in an optimal "on" position and preventing over-rotation, that could result in damage to the clutch once the "off" position has been reached. In this embodiment of the present invention, an over-center spring 202 or similar device may be used to urge an actuator spring arm 200 and housing arm 201 towards the "on" or "off" positions, helping to minimize ineffective intermediate positions. This spring-loaded clutch does not require precise positioning of the actuating arm 105 to place the actuator 104 in an optimal "on" or "off" position. Yet another benefit of a spring-loaded clutch is that too much pressure on actuating arm 105 in either direction could cause part of the housing 6, particularly projections 120, 122, 124, 126, 128, 129, depending on direction, to rub undesirably against the shaft.

To help further lighten the clutch assembly, the heavier metal parts such as the actuating arm 105 and the actuator spring arm 200 may have interior walls 190 and 192 defining lightening holes 191 and 193 respectively. In most respects, this alternative embodiment is similar in function to the embodiment illustrated by FIGS. 1–6. In this alternative embodiment, there are six rolling members 110, 111, 112, 114, 116 and 118. These rolling members perform the same function as those rolling members 10, 11, 12, 14 and 16 illustrated in the embodiment of FIGS. 1–6. Rolling members 110, 111, 112, 114, 116 and 118 are either brought into contact with shaft 107 (in the "on" position of the clutch) or out of contact with the Shaft 107 (in the "off" position). Housing projections 120, 122, 124, 120, 128 and 129 correspond in function to the housing projections 20, 22, 24, 26 and 28 of FIGS. 1 and 3. Housing fixing member 108 is used for attaching the clutch 101 to a surface.

Numerous variations will occur to those skilled in the art in light of the foregoing disclosure, without departing from the intended scope of the invention. For example, the number of rolling members used may be more or less than the illustrative embodiment. Likewise, the number of projections may be other than those of the illustrative embodiment. Various methods of fixing the housing 6 and effecting movement of the actuator 4 can be conceived. The arcuate concave area could be any shape that prevents the rolling member from contacting the shaft when urged into the off or unlocked position. The exterior shape of the clutch may be altered. The actuator may be spring-loaded into the "on" or the "off" positions or spring-loaded so that intermediate positions are minimized. Additional formations could be added to assist in accurately controlling rotation of the actuator. Many other applications for the switchable clutch of the present invention besides fishing reels may be used, such as for example xerographic copying machines, facsimile machines, roller skates and the like. These are merely illustrative.

Having thus described the invention, what is claimed and desired to be secured by Letters Patent is:

1. A clutch comprising:
   a housing member, said housing member having a housing fixing member for attachment to a surface, a back plate coextensive with said housing fixing member, said back plate defining a plane, a plurality of housing projections extending generally normal to the plane defined by said back plate;
   an actuator, said actuator having an inner surface comprising a plurality of flat surfaces, said flat surfaces forming an oblique angle with respect to an imaginary line through the flat surface and perpendicular to a radial line through the center of the actuator and further comprising a plurality of indented surfaces;
   a plurality of pockets formed by the interaction of said housing member and said actuator;
   a plurality of rolling members captured in said pockets;
   a plurality of biasing members urging said rolling members toward contact with both a rotatable shaft and said inner surfaces of said actuator; and
   said actuator rotatable with respect to said housing member such that when the actuator is rotated in a first, on position, the rolling members are in contact with both the rotatable shaft and the inner surfaces of actuator thereby limiting movement of rotatable shaft in one direction, and when said actuator is rotated in an opposite, second, off position, said inner surfaces of said actuator are moved a distance such as not to allow contact of the rolling members with both rotatable shaft and inner surfaces of actuator thereby allowing rotational movement of said rotatable shaft in either direction.

2. The clutch of claim 1 wherein said biasing members associated with said housing member and said rolling members are leaf springs.

3. The clutch of claim 1 wherein said housing member is fabricated from a non-metal material.

4. The clutch of claim 3 wherein said non-metal material is a plastic.

5. The clutch of claim 1 wherein said flat surfaces forming an oblique angle with respect to an imaginary line through the flat surface and perpendicular to a radial line through the center of the actuator form an oblique angle of between about eight and twenty degrees.

6. The clutch of claim 1 wherein the projections each further comprise an arcuate concave portion of generally the same radial profile as the rollers.

7. A clutch comprising:
   a first member comprising a back plate and a plurality of projections extending generally normal to a plane defined by the back plate;
   a second member having an inner surface comprising a plurality of circumferentially spaced cam ramps wherein the projections of the first member and the cam ramps of the second member define pockets when the second member is placed around the first member;
   a plurality of rollers, each roller located in one of the pockets;
   a plurality of biasing members, each biasing member urging one of the rollers toward contact with both a rotatable shaft and one of the cam ramps surfaces of the second member;
   wherein the first member and the second member are rotatable with respect to one another such that when the second member is rotated into a first, on position, the rollers are in contact with both the rotatable shaft and the cam ramps of second member thereby limiting movement of the rotatable shaft in one direction; and
   wherein when the second member is rotated in an opposite, off position, the cam ramps of the second member are moved to not allow contact of the rollers with either or both of the rotatable shaft and cam ramps thereby allowing rotation of the shaft in either direction.

8. The clutch of claim 7 wherein the projections each further comprises an arcuate concave portion of generally the seine radial profile as the rollers.

9. A clutch comprising:
   a housing comprising a back plate and a plurality of projections extending generally normal to a plane defined by the back plate;
   an actuator having an inner surface comprising a plurality of circumferentially spaced cam ramps wherein the projections of the housing and the cam ramps of the actuator define pockets when the housing is placed around the actuator;
   a plurality of rollers, each roller located in one of the pockets;
   a plurality of biasing members each attached to the clutch housing at one end and urging one of the rollers toward contact with both a rotatable shaft and one of the cam ramps surfaces of the actuator with an opposite end;
   wherein the housing and the actuator are rotatable with respect to one another such that when the actuator is rotated into a first, on position, the rollers are in contact with both the rotatable shaft and the cam ramps of the actuator thereby limiting movement of the rotatable shaft in one direction; and
   wherein when the actuator is rotated in an opposite, off position, the cam ramps of the actuator are moved to not allow contact of the rollers with either or both of the rotatable shaft and cam ramps thereby allowing rotation of the shaft in either direction.

10. The clutch of claim 1 wherein the projections each further comprise an arcuate concave portion of generally the same radial profile as the rollers.

* * * * *

UNITED STATES PATENT AND TRADEMARK OFFICE
CERTIFICATE OF CORRECTION

PATENT NO. : 6,568,516 B2
DATED : May 27, 2003
INVENTOR(S) : Fred M. Kemp, III

It is certified that error appears in the above-identified patent and that said Letters Patent is hereby corrected as shown below:

Column 4,
Line 5, replace "roiling" with -- rolling --
Line 58, replace "120" with -- 126 --

Signed and Sealed this

Sixteenth Day of September, 2003

JAMES E. ROGAN
*Director of the United States Patent and Trademark Office*